United States Patent [19]

Squirrell et al.

[11] Patent Number: 5,488,971

[45] Date of Patent: Feb. 6, 1996

[54] BLADES FOR ISOLATORS

[75] Inventors: Anton F. Squirrell, Mellingen, Switzerland; John Waldron, Rugby, England

[73] Assignee: WES Technology Inc., Santa Ana, Calif.

[21] Appl. No.: 162,062

[22] PCT Filed: Jun. 11, 1992

[86] PCT No.: PCT/GB92/01051

§ 371 Date: Jan. 25, 1994

§ 102(e) Date: Jan. 25, 1994

[87] PCT Pub. No.: WO92/22762

PCT Pub. Date: Dec. 23, 1992

[30] Foreign Application Priority Data

Jun. 11, 1991 [GB] United Kingdom ............... 9112541

[51] Int. Cl.⁶ ................................................ F16L 7/00
[52] U.S. Cl. .......................... 137/375; 251/298; 251/356
[58] Field of Search ........................... 137/375; 251/356, 251/298

[56] References Cited

U.S. PATENT DOCUMENTS

| 4,351,361 | 9/1982 | Worley | 251/298 |
| 4,821,507 | 4/1989 | Bachmann et al. | 60/39.182 |
| 4,919,169 | 4/1990 | Bachmann et al. | 137/875 |
| 5,120,021 | 6/1992 | Squirrell et al. | 251/298 |
| 5,159,954 | 11/1992 | Janich | 251/298 |

FOREIGN PATENT DOCUMENTS 0413944 2/1991 European Pat. Off..
1190753 4/1965 Germany.

*Primary Examiner*—A. Michael Chambers
*Attorney, Agent, or Firm*—Norbert P. Holler; Gottlieb, Rackman & Reisman

[57] ABSTRACT

A blade for an isolator, in particular for a diverter or flap isolator, which comprises a plurality of plate arms (21) to be attached to an isolator shaft (31), and a pair of plates (22), preferably comprising an array of panels, attached to the plate arms (21) and separated by a gas space (23). The plates (22) are suitably provided with insulation (27) retained by cladding (28). The blade plates (22) will usually be provided with convolutions (24) to give them improved stiffness, and the blade plates will furthermore be welded or otherwise secured together by fastening means such as a series of short tubes (25) extending therebetween.

9 Claims, 4 Drawing Sheets

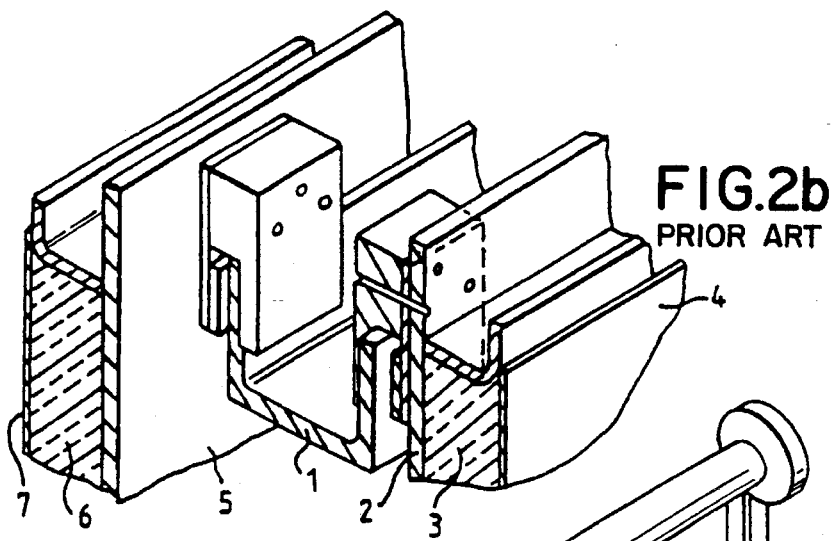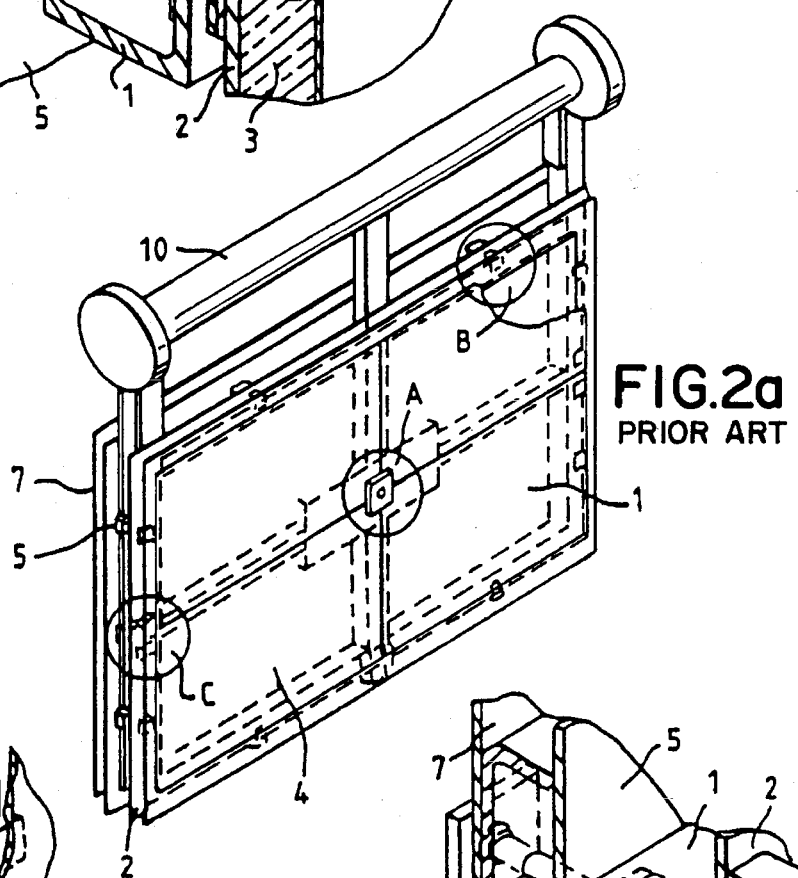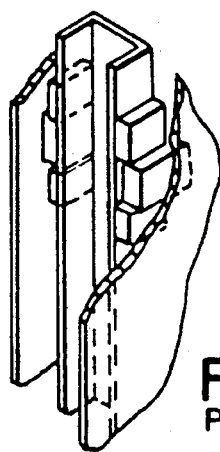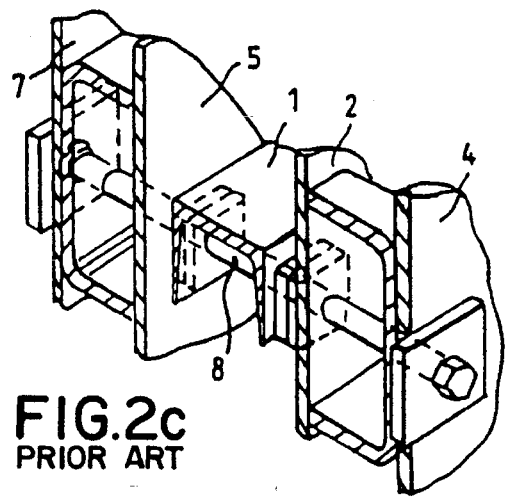

BLADES FOR ISOLATORS

This invention relates to improvements in or relating to blades for isolators, i.e. isolating valves, especially diverter and flap isolators. The invention is particularly concerned with the flap and blade construction (hereinafter referred to as the blade) of large such isolators.

BACKGROUND OF THE INVENTION

One of the main problems in the design of isolator blades is to provide a structure that can resist the applied loadings due to gas pressure, weight and seal loading, and will also not distort under start-up/shut down temperature transients as well as steady state elevated temperature operating conditions.

In the usual construction the blade assembly consists of a blade arm frame with individual blades attached to it, one for flap isolators, two for diverter valves, the attachment being carried out in such a way that differential movements are possible between the blades and blade arm frame.

A known blade structure is shown in FIG. 1 of the accompanying drawings, which is an exploded isometric view of a known type of blade structure of a diverter isolator, and which shows a blade arm frame 1, to one side of which is attached a boiler inlet blade 2 to which is in turn attached an insulation 3 and an insulation cladding 4. To the other side of the blade arm frame 1 is attached a bypass blade 5 to which is in turn attached another insulation 6 and an insulation cladding 7. The blade arm frame 1 itself has a central fixing 8 for the blades and blade location guides 9.

The operating shaft comprises a connecting shaft 10 and, at each end thereof, a stub shaft 11 having a keyed and bolted flange connection 12, a shaft seal 13, a high temperature shaft bearing 14, a coupling 15, and an actuator 16. The actuator 16 has a motor 17, a reduction gear box 18 and bevel gearing 19. There is also a hand wheel 20. It may be noted that the drive motor assembly can be mounted centrally or inboard of actuators over duct as site conditions allow.

Details of the blade structure shown in FIG. 1 are illustrated in FIGS. 2a–2d of the drawings, wherein FIG. 2a is a perspective view of the assembled blade structure, and FIGS. 2b, 2c and 2d are detailed perspective views showing the areas indicated A, B and C respectively in FIG. 2a. Specifically FIG. 2b shows a clamp arrangement between the various parts of the blade structure, and in particular illustrates the insulation infill 3 and 6, FIG. 2c shows the centre location pin structure, and FIG. 2d shows the guide key structure.

The disadvantage of this type of structure is that overall blade weight is high, leading to high operating torques.

BRIEF DESCRIPTION OF THE INVENTION

The present invention relates particularly to diverter and flap isolators for high temperature applications.

The present invention provides a blade for an isolator, in particular for a diverter or flap isolator, which comprises a plurality of plate arms to be attached to an isolator shaft, and a pair of plates (preferably comprising an array of panels) attached to the plate arms and separated by a gas space, which plates are suitably provided with insulation retained by cladding, preferably in the form of cladding panels.

The blade plates are of such a width as to fit between the plate arms. They will be made in as long lengths as possible and only joined (by welding) where necessary.

The blade plates, which will be thin plates, will usually be provided with convolutions of some sort to given them improved stiffness. The blade plates will furthermore be welded or otherwise secured together by means such as a series of short tubes extending therebetween.

The present invention thus provides a one-piece blade which has the effect of reducing the operating torque. A main feature of the design is that all main parts of the blades are wetted by the hot gas at all times.

The blade according to the invention comprises a number of plate arms, the actual number depending upon the operation conditions and size. At the shaft end these are suitably stiffened to increase the section modulus as required. Between each two adjacent arm thin plates separated by a gas space are welded to the arms. Depending on the size these skin plates are provided with convolutions to give stiffness in the direction parallel to the shaft and to limit the size of each flat plate area to a roughly square aspect ratio. The blade plates are provided with additional support by means of short tubes protruding through each plate and welded to the plates on the outside. In the same way insulation cladding pins are taken right through each plate and thus provide additional support.

The edges of each blade plate are provided with a special edge section to form the seal mountings. The shape of this edge section is so arranged to allow the greatest possible contact to the gas. At the edges perpendicular to the shaft the seal edge section is welded to the outside of the outer arms. Between each two arm, on each side of the blade, are provided trays to allow the convenient fitting of thermal insulation, retained by cladding panels. This performs the function not only of reducing the heat transfer across the blade when in the terminal position(s), but also serves to maintain the structural skin at the gas temperature to miniraise distortion.

In the terminal positions, as well as in intermediate positions, there is a free gas path through the centre of the blade which allows the whole structure to be kept at the gas temperature at all times, eliminating the risk of distortion.

The invention will be further described by way of example only, with reference to the accompanying drawings, in which:

BRIEF DESCRIPTION OF THE DRAWINGS

FIG. 2a is a perspective illustration of the blade structure of FIG. 1 in its assembled state;

FIGS. 2b, 2c and 2d are, respectively, fragmentary detail views, in perspective and partly in section or broken away, showing, on an enlarged scale, the portions of the blade structure encompassed by the circled regions A, B and C in FIG. 2a;

FIG. 3b is a section taken along the line A—A in FIG. 3a;

DETAILED DESCRIPTION OF THE INVENTION

Figure 1:
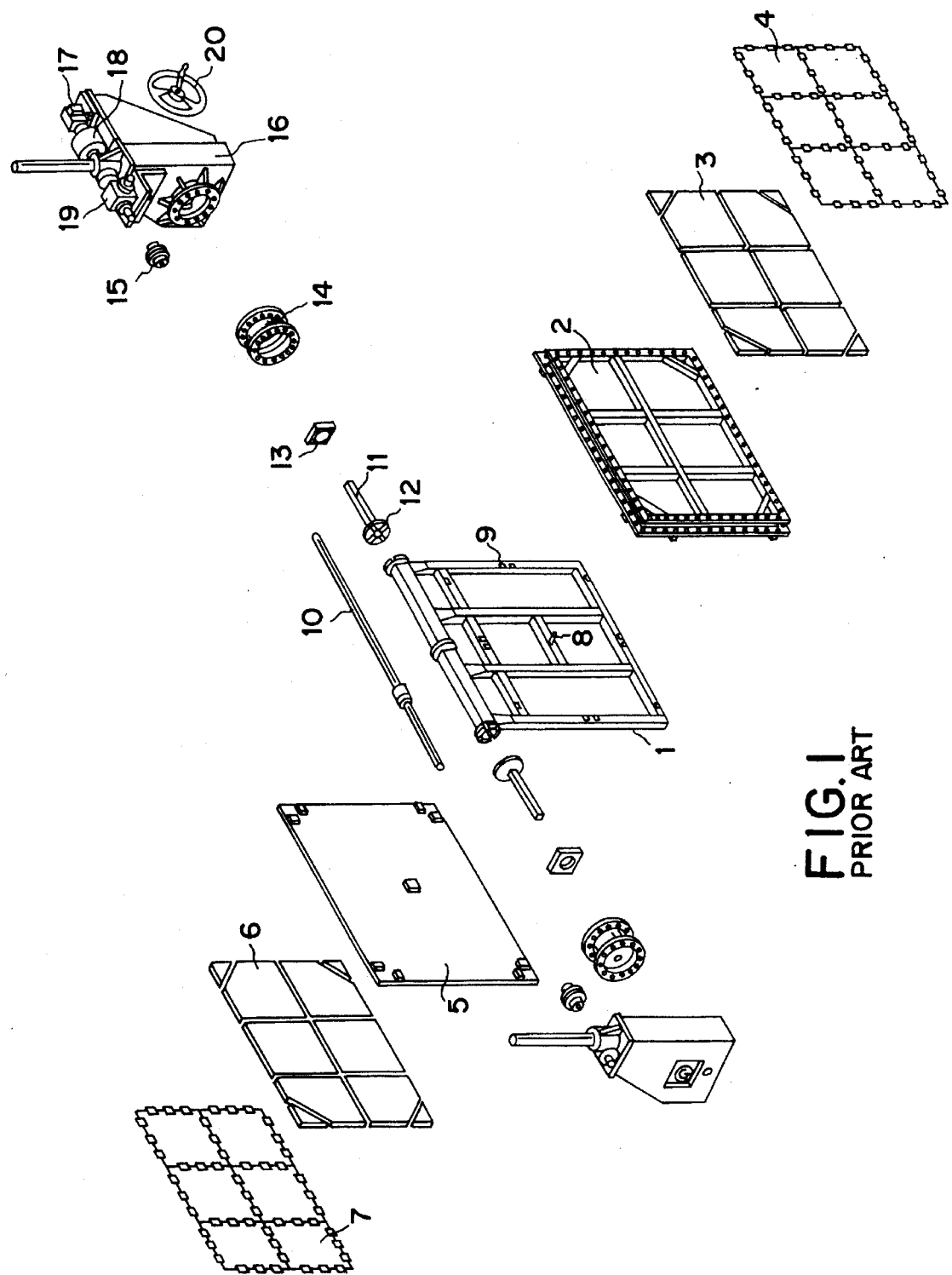
FIG. 1 is an exploded isometric view of a known type of blade structure for a divefret isolator.
Figure 3B:
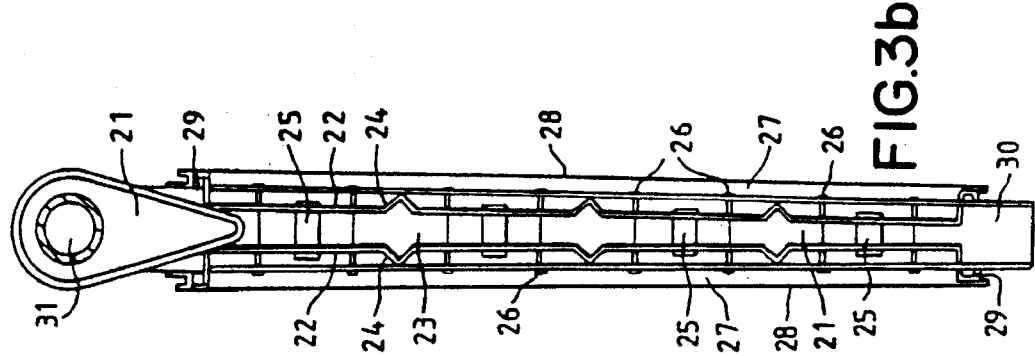
Figure 3A:
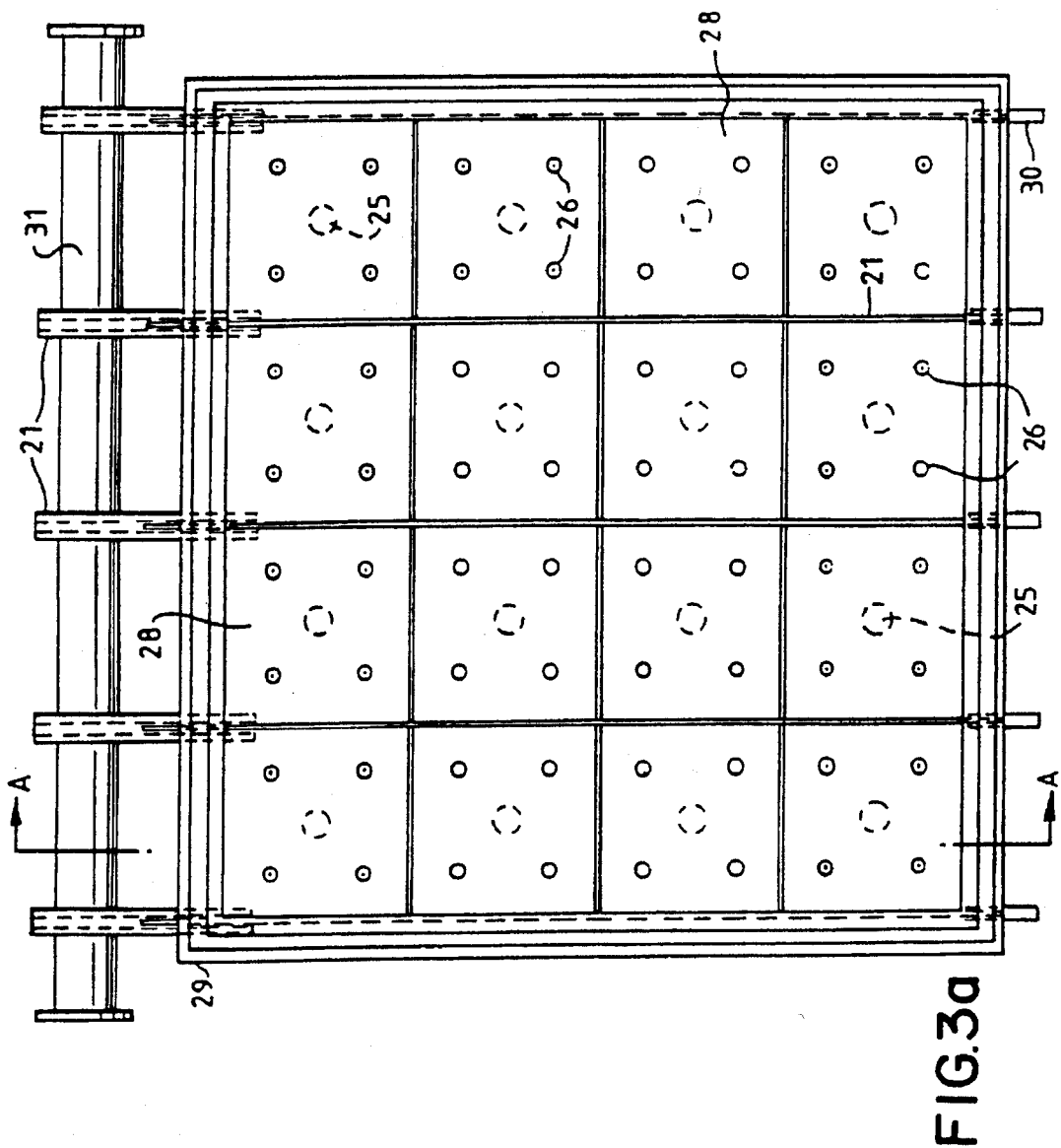
FIG. 3a is a front view of a blade structure according to the present invention.

The blade structure of the present invention shown in the drawings comprises a number of plate arms 21, the actual number of arms depending upon the operation conditions and size. At the shaft end these are suitably stiffened to increase the section modulus as required. Between each two adjacent arm 21 two thin plates 22, separated by a gas space 23, are welded to the arms 21. Depending on the size these skin or blade plates are provided with convolutions 24 to give stiffness in the direction parallel to the isolator shaft and to limit the size of each flat plate area to a roughly square aspect ratio, as shown. The blade plates 22 are provided with additional support by means of short tubes 25 protruding through each plate and welded to the plates on the outside. In the same way insulation cladding pins 26 are taken right through each plate and thus provide additional support. The thin plates 22 are each provided on the outside surface thereof with insulation 27 retained by cladding 28.

The edges of the blade are provided with a special edge section 29 to form the seal mountings. The shape of this edge section is so arranged to allow the greatest possible contact to the gas. At the edges perpendicular to the shaft the seal edge section is welded to the outside of the outer arms. Between each two arms, on each side of the blade there are provided trays to allow the convenient fitting of the thermal insulation 27, retained by the cladding panels 28. This performs the function not only of reducing the heat transfer across the blade when in the terminal position(s), but also serves to maintain the structural skin at the gas temperature to miniraise distortion.

The arms 21 are provided with extensions 30 which function as blade s tops.

The isolator shaft itself is indicated by reference numeral 31.

Figure 4A:
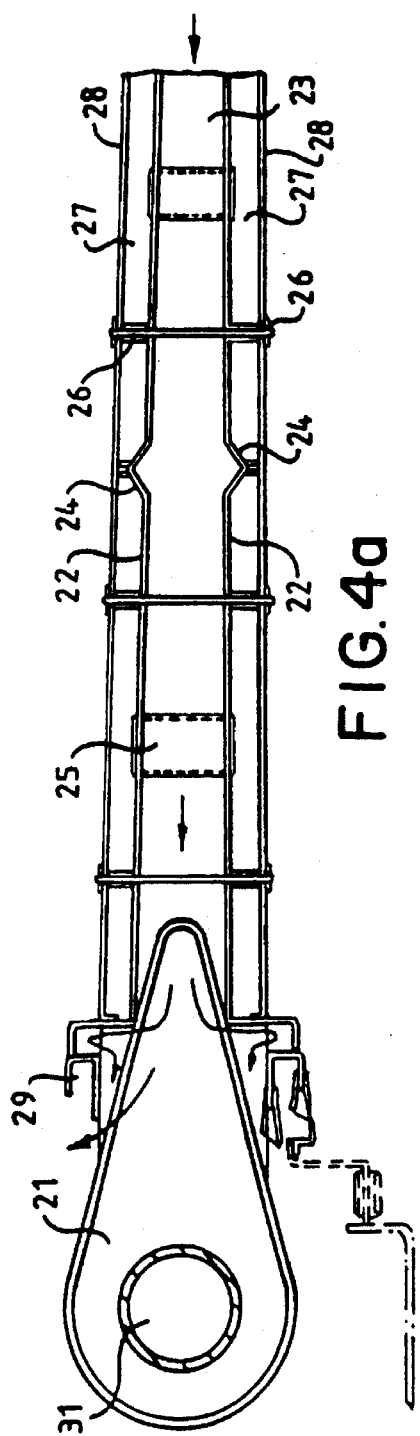
FIG. 4a is an enlarged side view illustrating the blade structure of FIG. 3 in more detail and also illustrating gas flow paths through the blade structure.
Figure 4B:
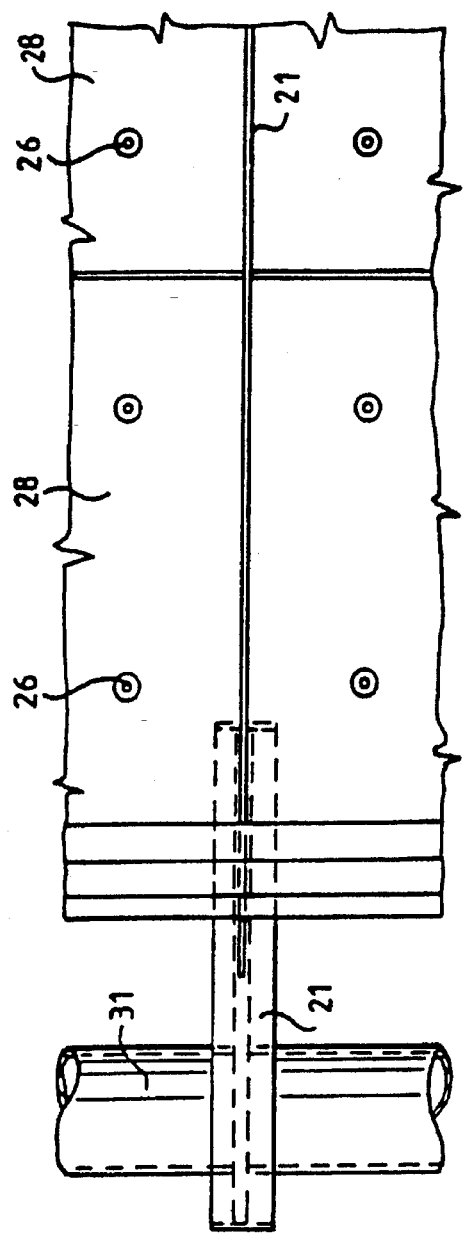
FIG. 4b is an enlarged front view showing a detail of the blade structure of FIG. 3.

In the terminal positions, as well as in intermediate positions, of the blade there is defined by the spaced plates 22 a free gas path through the centre of the blade, which gas space is essentially unobstructed over its entire extent and thus allows substantially the whole blade structure to be kept at the gas temperature at all times, eliminating the risk of distortion, as shown by the arrows in FIG. 4a.

We claim:

1. A blade for a gas isolator including an isolator shaft having a longitudinal axis, the blade comprising at least two blade arms adapted to be attached to said isolator shaft transversely to said axis of the latter and in spaced relation to one another along said axis of said isolator shaft, and a pair of plates arranged in face to face relation with each other, each of said plates being attached at opposite edges thereof to said blade arms and said plates having their proximate faces separated from each other over their entire expanse so as to define therebetween a free gas space in the interior of the blade, said free gas space enabling hot gases entering said gas space to wet said plates over substantially their full extent for maintaining the full blade at the gas temperature.

2. A blade as claimed in claim 1, wherein said blade includes more than two arms, and said plates comprise an array of panels each located between a respective pair of adjacent ones of said blade arms.

3. A blade as claimed in claim 1 or 2, wherein said plates are provided with insulation at their respective remote faces, and cladding means overlie said insulation for retaining the latter in place on said plates.

4. A blade as claimed in claim 1 or 2, wherein said plates are provided with convolutions for enhancing their stiffness in a direction parallel to said axis of said isolator shaft.

5. A blade as claimed in claim 1 or 2, wherein said plates of each pair of plates are secured to one another by a plurality of fastening means extending therebetween.

6. An isolator, in particular a diverter or flap isolator, which is provided with a blade as claimed in claim 1 or 2.

7. An isolator, in particular a diverter or flap isolator, which is provided with a blade as claimed in claim 3.

8. An isolator, in particular a diverter or flap isolator, which is provided with a blade as claimed in claim 4.

9. An isolator, in particular a diverter or flap isolator, which is provided with a blade as claimed in claim 5.

* * * * *